United States Patent [19]

Nagler et al.

[11] Patent Number: 5,146,474
[45] Date of Patent: Sep. 8, 1992

[54] CIRCUIT ARRANGEMENT FOR THE ROUTINE TESTING OF AN INTERFACE BETWEEN LINE TERMINATOR GROUPS AND THE SWITCHING MATRIX NETWORK OF A PCM TELECOMMUNICATION SWITCHING SYSTEM

[75] Inventors: Werner Nagler, Hohenschaeftlarn; Rudolf Krumenacker, Munich, both of Fed. Rep. of Germany

[73] Assignee: Siemens Aktiengesellschaft, Munich, Fed. Rep. of Germany

[21] Appl. No.: 652,610

[22] Filed: Feb. 8, 1991

[30] Foreign Application Priority Data

Mar. 23, 1990 [EP] European Pat. Off. ........ 90105564.0

[51] Int. Cl.⁵ .............................................. H04J 3/14
[52] U.S. Cl. ........................................ 375/10; 370/15; 370/16; 371/20.5
[58] Field of Search ........................ 370/13, 15, 16, 53; 371/8.2, 20.1, 20.5; 379/5, 9, 10, 29; 340/825.01

[56] References Cited

U.S. PATENT DOCUMENTS

| | | | |
|---|---|---|---|
| 4,071,704 | 1/1978 | Moed | 370/14 |
| 4,688,208 | 8/1987 | Kawaguchi | 379/5 |
| 4,688,209 | 8/1987 | Banzi, Jr. et al. | 370/15 |
| 4,860,333 | 8/1989 | Bitzinger et al. | 379/10 |
| 4,953,195 | 8/1990 | Ikemori | 379/9 |

FOREIGN PATENT DOCUMENTS

WO8501410 10/1985 PCT Int'l Appl. .

*Primary Examiner*—Benedict V. Safourek
*Attorney, Agent, or Firm*—Hill, Van Santen, Steadman & Simpson

[57] ABSTRACT

The interfaces between line terminator groups of a pair of redundant line terminator groups each comprise an interface circuit which makes it possible, by being equipped with a write-read memory, a switch-over device and a control device that controls these components, to test the interface parts belonging to an active line terminator group in a spot-check fashion during a time channel reserved for this purpose and to test the interface parts belonging to the passive line terminator group during all time channels on the basis of a respective check word mirroring.

2 Claims, 2 Drawing Sheets

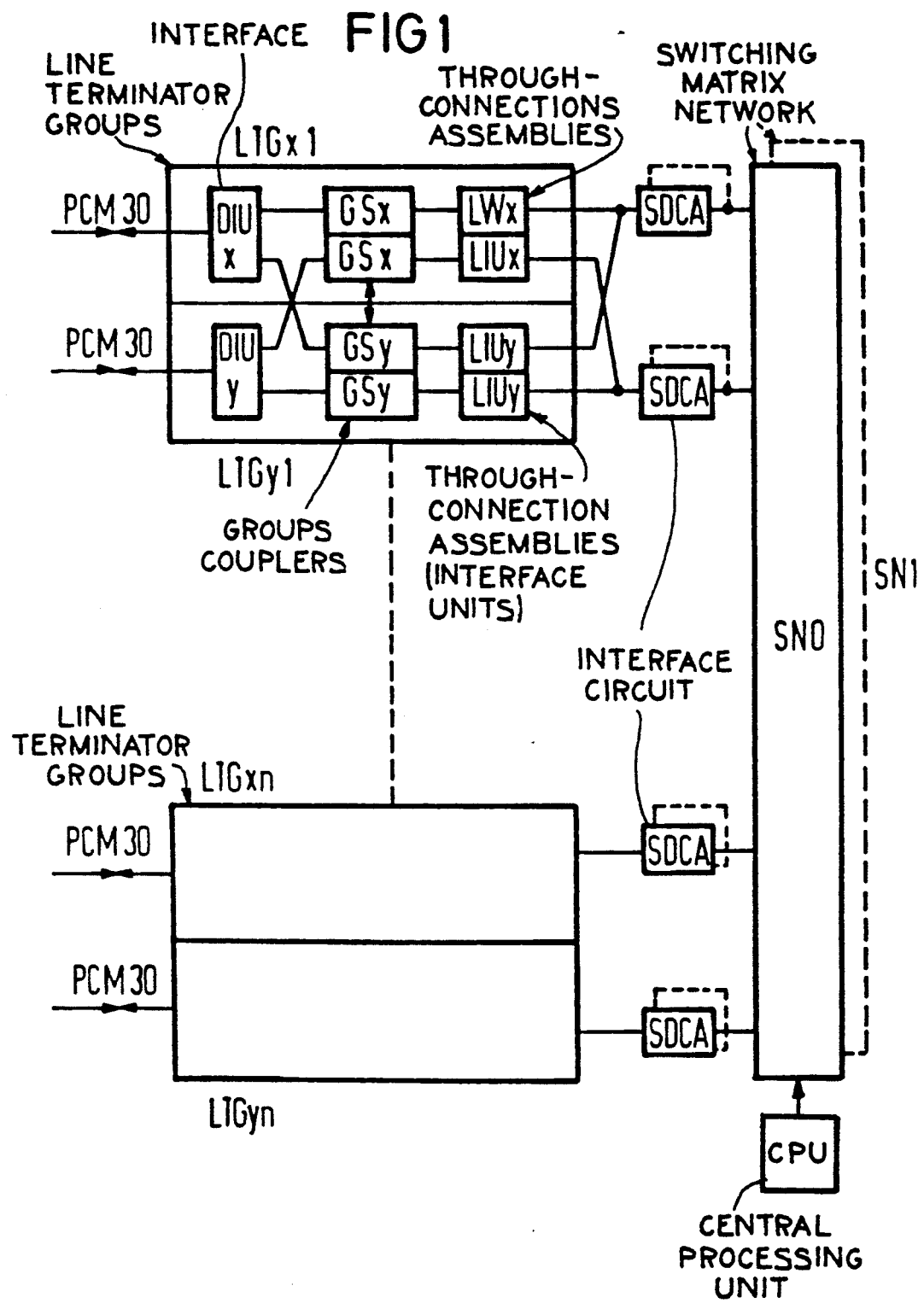

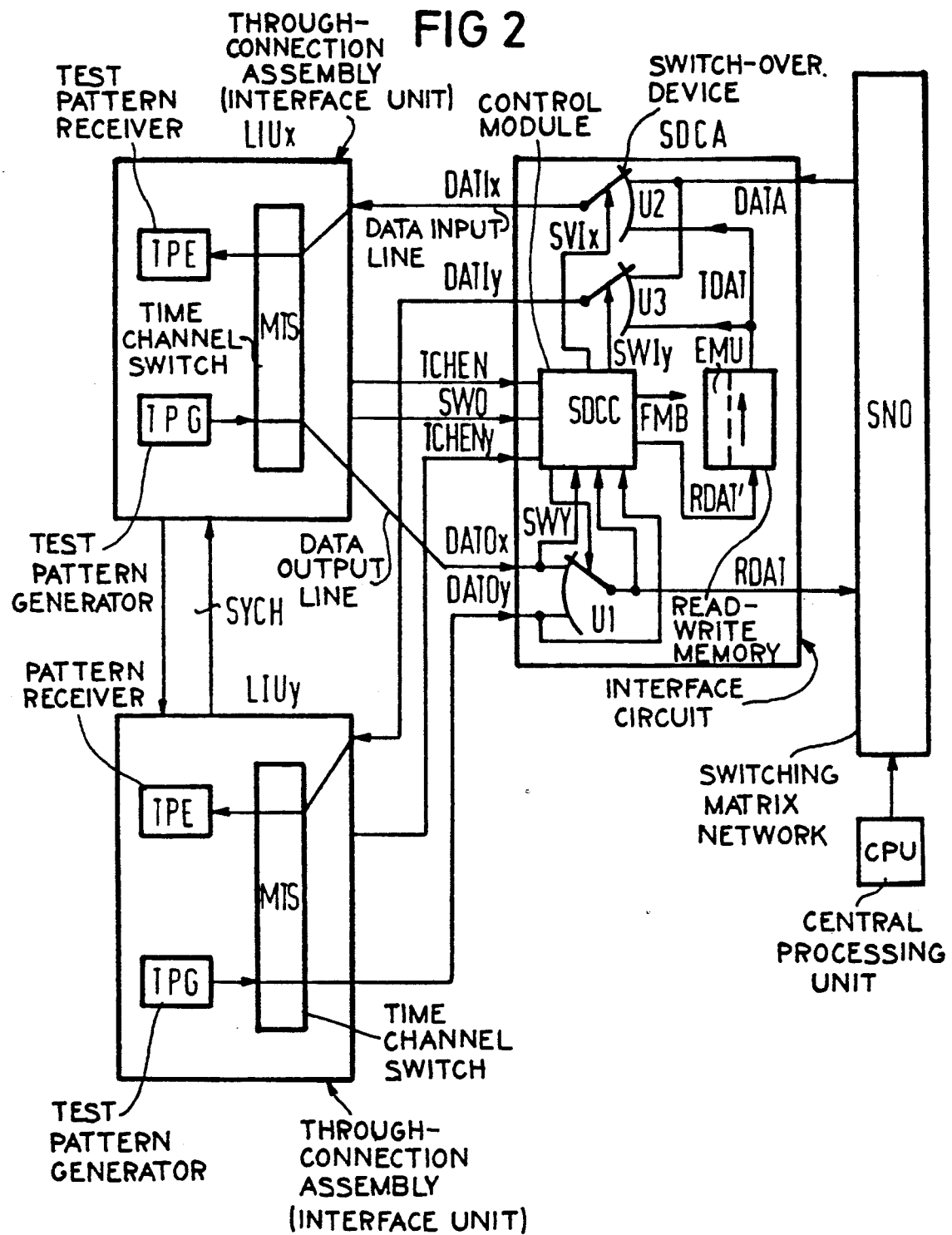

CIRCUIT ARRANGEMENT FOR THE ROUTINE TESTING OF AN INTERFACE BETWEEN LINE TERMINATOR GROUPS AND THE SWITCHING MATRIX NETWORK OF A PCM TELECOMMUNICATION SWITCHING SYSTEM

BACKGROUND OF THE INVENTION

1. Field of the Invention

The present invention relates to a circuit arrangement nearest for routine testing of the interface comprising an interface circuit and located between the line terminator groups of pairs of line terminator groups for the connection of telecommunication lines to the switching center of a pulse-code modulated (PCM) switching system and to the switching matrix network system, and in which the pairs of line terminator groups form a unit in such a fashion that, given outage of central parts of one of the line terminator groups, the telecommunication traffic appertaining to the total of telecommunication lines connected to this particular line terminator group can be sequenced via redundant parts of the other line terminator group in an alternate routing mode, to which end the interface circuits contain switch-over devices that, in the alternate routing mode, forward telecommunication information coming from the switching matrix network and intended for the line terminator group to which they are allocated not to the line terminator group, but to the redundant central parts of the other line terminator group or, respectively, conduct telecommunication information coming from the redundant central parts of this line terminator group to the switching matrix network terminals allocated to the other line terminator group. The present invention is accordingly related to a circuit configuration wherein line terminator groups for the connection of telecommunication lines to the switching center of a PCM telecommunication system form a unit in pairs in such a fashion that they can substitute for one another given outages at their central region.

2. Description of the Prior Art

As shown in FIG. 1, line terminator groups LTG to which links PCM30 are connected in the illustrated case form pairs of line groups LTGx1, LTGy1 - - - LTGxn, LTGyn. As critical components parts of these line terminator groups, interfaces DIUx, DIUy at the link side, as well as interface units LIUx, LIXy at the side of the switching matrix network SNO/SN1 are illustrated and group couplers GSx and GSy are shown as simple parts. The group couplers GS and the interface units LIU are redundant, whereby, as shown in FIG. 1, the one half is related to the sequencing of the telecommunication traffic in conjunction with the link connected to the appertaining line terminator group and the other half is related to the links connected to the partner line terminator group. The control-oriented connection of the line terminator groups is such that, during normal operation, the traffic in conjunction with the link connected to the one line terminator group is sequenced via the one half of the group coupler GS and via the interface circuit LIU and connections that relate to the link connected to the partner line terminator group are set up as a precautionary measure in the other half of the group coupler but are not connected through. The appertaining switching traffic is sequenced via the corresponding, redundant parts GS and LIU of the partner line terminator group only given an outage of the group coupler GS of a line terminator group LTG or of the interface unit LIU.

Belonging to the interfaces between the line terminator groups LTGx and LTGy are interface circuits SDCA that, among other things, contain switch-over devices that, in the equivalent circuit diagram, forward telecommunication information coming from the switching matrix network SN and destined for the line terminator group to which they are allocated, not to the line terminator group, but to the redundant central parts of the other line terminator group or, respectively, conduct telecommunication data coming from the redundant central parts of this, central line terminator group to the switching matrix network terminals allocated to this other line terminator group.

As indicated with broken lines, for connection between the line terminator groups and the second half SN1 of the redundant switching matrix network SN0/SN1, a respective second such interface circuit SDCA is provided for a pair of line terminator groups, i.e. a total of four interface circuits.

The present invention is therefore directed to the routine testing of the interfaces, i.e. of the connecting paths to the interface circuits SDCA and of the interface circuits themselves.

In this context of this time channels available for the transmission between the line terminator groups of and the switching matrix network (there being 128 time channels in a specific embodiment), a check code word was heretofore transmitted from the active line terminator group in normal operation with reference to the interface, was mirrored in the interface circuit and returned to the line terminator group for a comparison with the pattern of the transmitted check word occurred. The conditions during one time channel are therefore interpreted as representative of those during the other time channels. The parts of the interface that are in communication with the line terminator group that is passive during normal operation as well as the switch-over device within the interface circuit SDCA are not covered at all in this procedure.

This is disadvantageous insofar as it is not certain, in the case of the necessity of a switching into the standby mode, whether the appertaining interface parts or, respectively, the switch-over device can work properly.

Although it can be largely assured in the initially-mentioned alternate procedure that connection losses remain low when switching, a switching only for the purpose of implementing the routine tests in the aforementioned manner would lead to unreasonable deteriorations, since it must occur relative often. Moreover, the previous testing is also considered inadequate because of the aforementioned spot check character.

SUMMARY OF THE INVENTION

It is therefore the object of the present invention to provide a circuit arrangement for the routine testing of an interface of the type initially set forth above that, without deteriorating the ongoing telecommunication traffic, also allows those parts of the interface pertaining to them momentarily-passive line terminator group to be so completely and reliably monitored that it can be assumed at the moment an alternate switching is undertaken that these interface parts work properly.

The above object is achieved, according to the present invention, in a circuit arrangement for the routine testing of the interface respectively comprising an interface circuit and located between the line terminator groups of pairs of line terminator groups for the connection of telecommunication lines to the switching center of a PCM switching system and to the switching matrix network of the switching system, in which the pairs of line terminator groups form a unit in such a fashion that, given outrage of central parts of one of the line terminator groups, the telecommunication traffic appertaining to the total of telecommunication lines connected to this line terminator group can be sequenced via redundant parts of the other line terminator group in an alternate routing mode, to which end the interface circuits contain switch-over devices that, in the alternate routing mode, forward telecommunication information coming from the switching matrix network and intended for the line terminator group to which they are assigned, not to the line terminator group, but to the redundant central parts of the other line terminator group or, respectively, conduct telecommunication information coming from the redundant central parts of this line terminator group to the switching matrix network terminals assigned to the other line terminator group, and is particularly characterized in that the interface circuit additionally comprises (a) a write-read memory that, on the basis of the time channels, can accept information coming both from the one as well as from the other line terminator group, proceeding wherefrom (following a time delay) these can be transmitted back to the line terminator groups instead of telecommunication information resulting from the switching matrix network;

(b) in addition to the composed of a first part that serves the purpose of forwarding telecommunication information coming either from the line terminator group to which the interface circuit assigned or from the other line terminator group, the switch-over device is also composed of two further parts that each respectively assigned to a different line terminator group of the two line terminator groups and, depending on their switch position, serve the purpose of forwarding telecommunication information coming from the switching matrix network or information read from the write-read memory to the respective assigned line terminator group; and (c) a controller supplies respective separate control signals for the individual parts of the switch-over device, as well as for the operation of the write-read memory.

In addition to implementing the spot check test, as previously implemented in conjunction with the interface pertaining to the momentarily-active line terminator group, the circuit arrangement of the present invention makes it possible to completely monitor, i.e. to routinely monitor, the interface parts pertaining to the passive line terminator group during all time channels without any deteriorations whatsoever arising.

BRIEF DESCRIPTION OF THE DRAWINGS

Other objects, features and advantages of the invention, its organization, construction and operation will be best understood from the following detailed description, taken in conjunction with the accompanying drawings, on which:

FIG. 1 is a schematic representation of redundant line terminator groups connected by way of interface circuits to a switching matrix network;

FIG. 2 is a schematic representation of an interface circuit, together with the interface units at the switching matrix network side of two line terminator groups which form a pair of line terminator groups.

DESCRIPTION OF THE PREFERRED EMBODIMENTS

FIG. 2 illustrates a pair of line terminator groups LTGx/LTGy as shown in FIG. 1 that is part of the assembly LIUx by way of which the traffic from and to the switching matrix network SN0/SN1 is sequence during normal operation or, respectively, that redundant part of the assembly LIUy belonging to the terminator group LTGy by way of which the traffic pertaining to the line terminator group LTGx or, respectively, to the line PCM30 connected thereto can be sequenced in an alternate routing mode.

The basic jobs of these assemblies LIUx and LIUy are the through connection or, respectively, readied through connection of the voice channels, coordination of the answerback traffic between a group controller of the line terminator group and the coordination processor of the switching center to which this line terminator group belongs, as well as the implementation of a number of tests which also include the routine tests implemented with the assistance of the circuit arrangement of the present invention.

The component parts shown as the sole component parts of this assembly are related to this latter tests, in particular a test pattern generator TPG, a test pattern receiver TPE, and a time channel switch MTS by way of which, mainly, the telecommunication information from and to the links are conducted and by way of which the test patterns transmitted by the pattern generator TPG can be transmitted on a time channel-suited basis onto the data output line DATOx or, respectively, information incoming from the data input line DATIx which will be a matter of mirrored test patterns can be transmitted to the test pattern receiver TPE. The actual telecommunication information between the line terminator group and the switching matrix network are also transmitted via the lines DTOx and DTIx.

As a component part of the interface between the line terminator groups and the switching matrix network, FIG. 2 illustrates the interface circuit SDCA that, according to the illustration in FIG. 1, is the upper of the two interface circuits shown with solid lines. The assembly parts LIUy and LIUx are connected in a corresponding circuit-oriented transposition in the interface circuit SDCA shown at the bottom in the illustration of FIG. 1.

As component parts of the interface circuit SDCA, FIG. 2 illustrates a write-read memory EMU whose input side can accept information via a control module SDCC from the assemblies LIUx and LIUy or, respectively, proceeding wherefrom these information can be transmitted back to these assemblies for the realization of a mirror function, as shall be set forth in greater detail blow. The interface circuit SDCA further contains a switch-over device composed of the elements U1, U2 and U3.

The first element U1 of the switch-over device serves the purpose of optionally forwarding either data incoming on the data line DATOx proceeding from the assembly LIUx or data incoming on the data line DATOy from the assembly LIUy to the switching matrix network portion SN0 of the redundant switching matrix network SN0/SN1.

The second element U2 of the switch-over device serves the purpose of optionally switching data incoming at the data side DAT proceeding from the switching matrix network part SN0 or information read from the write-read memory EMU onto the data line DATIx and, therefore, transmitting these data to the assembly LIUX. The third element U3 of the switch-over device has a corresponding job with respect to the information forwarding to the assembly LIUy, this third element U3, accordingly, through-connecting information coming from the switching matrix matrix network or information read from the write-read memory EMU onto the data line DATIy that leads to the assembly LIUy.

Both the write-read memory EMU and the three elements U1–U3 of the switch-over device are under the controlling influence of the control modules SDCC and can thereby be driven on a time-channel basis and independently of one another.

The operation of the circuit arrangement of the present invention shall be set forth in greater detail below.

During normal operation, i.e. when the line terminator group that belongs to the assembly LIUx is in its active condition, the switch-over elements U1 and U2 have a switch position illustrated on the drawing during the time channel KO–K127, so that the telecommunication information coming from the assembly LIUx on the data line DATOx in these time channels are forwarded on a line RDAT to the switching matrix network FNO or, respectively, the telecommunication information coming from the switching matrix network on the line DATA proceeding via the data line DATIx to the assembly LIUx.

During the time channel K127, the test pattern generator TPG of the assembly LIUx transmits a check word that proceeds via the line DATOx to the control module SDCC and is forwarded from the control module SDCC to the write-read memory EMU. After a delay of one pulse frame, it is again read from the memory EMU and proceeds via the element U2 of the switch-over device, which assumes its other switch position during a time channel, and via the data line DATIx back to the assembly LIUx where it is communicated by the time channel switch MTS to the test pattern receiver TPE which identifies whether or not there is coincidence with the transmitted test pattern.

As indicated above, that part of the interface pertaining to the line terminator group LTGx that belongs to the assembly LIUx is tested in a spot-check fashion, namely with respect to the time channel K127.

In another operating mode, parts of the interface pertaining to the line terminator group LTGy that belongs to the assembly LIUy can be checked on all time channels KO–K127 while the exchange of telecommunication information between the assembly LIUx and the switching matrix network SNO occurs on the channels KO–K126. In this case, the test pattern generator KPG of the assembly LIUy transmits test patterns during the time channels KO–K127 that proceed via the control module SDCC to the write-read memory EMU and then proceed from the write-read memory EMU via the switch-over element U3, that assumes the switch position opposite to that shown in FIG. 3, and via the data line DATIy back to the assembly LIUY where a connection through to the test pattern receiver TPE occurs.

It is indicated in FIG. 2 that imformation supplied on the data lines DATOx and DATOy can proceed to the control module SDCC both directly as well as via the switch-over element U1 given an appropriate switch position of the element U1. In a manner not illustrated, the control module SDCC can undertake a selection of the information that have proceeded thereto on these paths in the forwarding to the write-read memory EMU. For this reason and because of the aforementioned time channel-wise drivability of the switch-over elements U1–U2, it is possible to also check the function of the switch-over elements and, in particular, of the switch-over element U1.

Routine tests are also possible in the alternate routing mode of the line terminator groups of the line terminator group pair with the assistance of the circuit arrangement of the present invention, this, however, assuming that the assembly element IU of the line terminator group that has been alternately switched is not malfunctioning of is no longer malfunctioning since, of course, it contains the device TPE and the device TPG required for such a test. Such a test preferably comes into consideration before a switch is to be undertaken back from the alternate routing mode into the normal mode.

As mentioned above, the interface circuit LIUy illustrated in FIG. 2 is a matter of the redundant interface part of a line terminator group LTGy that forms a pair of line terminator groups together with the line terminator group LTGx that belongs to the interface circuit LIUx. In the alternate routing mode, contrasted to the normal mode set forth above, the traffic that pertains to the transmission line PCM30 connected to the line terminator group LTGx is sequenced via the redundant interface part LIUy. In this case, the element U1 of the switch-over device assumes a switch position in a first operating mode during the time channels K1–K126 in which a connection of the data line DATOy to the data line RDAT leading to the switching matrix network is produced. The element U3 of the switch-over device assumes a switch position in which the data line DATA coming from the switching matrix network SNO is connected to the data line DATIy leading to the interface circuit LIUy. In the time channel K127, the element U3 of the switch-over device connects the output of the write-read memory EMU to the data line DATIy, so that a mirror function with respect to a check word transmitted in this time channel by the test pattern generator TPG of the interface circuit LIUy is realized.

In a second operating mode of this redundancy operation, the element U1 of the switch-over device assumes a switch position wherein it produces a connection to the data line DATOx, in contrast whereto the element U2 of the switch-over device assumes a switch position wherein the output of the write-read memory EMU is connected to the data line DATIx, so that the test pattern transmitted by the test patten generator TPG of the interface circuit LIUx can be mirrored back to the interface circuit LIUx during these time channels.

Although we have described our invention by reference to particular illustrative embodiments thereof, many changes and modifications of the invention may become apparent to those skilled in the art without departing from the spirit and scope of the invention. We therefore intend to include within the patent warranted hereon all such changes and modifications as may reasonably and properly be included within the scope of our contribution to the art.

WE CLAIM:

1. In a circuit arrangement for the routine testing of the interface between the connector modules of pairs of connector modules for the connection of telecommunication lines to a pulse-code modulation (PCM) exchange and the switching network of this PCM exchange, each of said interfaces comprising an interface circuit, each of said each of said interface circuits connected between line terminator groups of pairs of line terminator groups for the connection of telecommunication lines to the switching center of the pulse-code modulation switching system and to the switching matrix network of the pulse-code modulation switching system, in which the pairs of line terminator groups form a unit such that, given outage of central parts of one of the line terminator groups of a pair of line terminator groups, the telecommunication traffic pertaining to the total of the telecommunication lines connected to that one line terminator group can be sequenced via redundant parts of the other line terminator group of the pair of line terminator groups in an alternate routing mode and in which, for this purpose, the interface circuits include switch-over devices that, in the alternate routing mode, forward telecommunication information coming from the switching matrix network and destined for the line terminator groups to which such interface circuits are assigned, do not transmit to that assigned line terminator group, but transmit to the redundant central parts of the other line terminator group of the respective pair of line terminator groups, and, respectively, conduct telecommunication information coming from the redundant central switching parts of the other line terminator group to the switching matrix network terminals assigned to this other line terminator group, the improvement wherein each of said interface circuits comprises:

a write-read memory operable on a time channel basis to accept imformation coming from the line terminator groups for transmission, after a predetermined time delay, back to the line terminator groups instead of telecommunication information deriving from the switching matrix network;

a first switching element for forwarding telecommunication information coming either from the line terminator group assigned to the interface circuit or from another line terminator group, and second and third switching elements each assigned to a respective line terminator group and, dependent on their switch positions, forward telecommunication information coming from the switching matrix network or information read from said write-read memory to the respectively-assigned line terminator group; and a controller connected to said write-read memory and to said first, second and third switching elements for providing control signals thereto for operating said switching elements and said write-read memory.

2. In a circuit arrangemnt according to claim 1, wherein:

said connector modules each comprise a test pattern generator and a test pattern receiver, so that test patterns transmitted by said test pattern generator of a connector module can be looped back to the test pattern receiver thereof.

* * * * *